US007075992B2

(12) United States Patent
Chen et al.

(10) Patent No.: US 7,075,992 B2
(45) Date of Patent: Jul. 11, 2006

(54) DIGITAL LIGHTING CONTROL SYSTEM WITH VIDEO INPUT

(75) Inventors: Shun-Chih Chen, Chia-Yi Hsien (TW); Kan-Ting Liao, Tai-Nan Hsien (TW); Chia-Yi Lee, Kaohsiung (TW); Wen-Chin Kan, Toufen Township (TW)

(73) Assignee: Optp Tech Corporation, Hsinchu (TW)

( * ) Notice: Subject to any disclaimer, the term of this patent is extended or adjusted under 35 U.S.C. 154(b) by 367 days.

(21) Appl. No.: 10/618,038

(22) Filed: Jul. 11, 2003

(65) Prior Publication Data

US 2005/0007038 A1 Jan. 13, 2005

(51) Int. Cl.
*H04N 7/12* (2006.01)
*G09G 5/00* (2006.01)

(52) U.S. Cl. .................. 375/240.26; 345/204; 345/619

(58) Field of Classification Search ................ 315/294, 315/312; 361/231; 375/240.28, 240.01; 345/204

See application file for complete search history.

(56) References Cited

U.S. PATENT DOCUMENTS

| | | | | |
|---|---|---|---|---|
| 4,241,295 | A * | 12/1980 | Williams, Jr. | 315/294 |
| 5,406,176 | A * | 4/1995 | Sugden | 315/292 |
| 5,675,382 | A * | 10/1997 | Bauchspies | 375/240.25 |
| 5,684,538 | A * | 11/1997 | Nakaya et al. | 375/240.17 |
| 2003/0152148 | A1* | 8/2003 | Laksono | 375/240.24 |
| 2004/0196140 | A1* | 10/2004 | Sid | 340/3.1 |
| 2005/0259117 | A1* | 11/2005 | Rackham | 345/619 |
| 2006/0077193 | A1* | 4/2006 | Thielemans et al. | 345/204 |

* cited by examiner

*Primary Examiner*—Thuy V. Tran
*Assistant Examiner*—Angela M Lie

(57) ABSTRACT

The present invention is a digital lighting system controller with video input capability. The present invention provides both an interface for video input and VGA input, and can also be used with standard DMX-512 interface. Therefore, the present invention of a lighting system controller can be used both in lighting systems with standard DMX-512 interface, and regularly or irregularly arranged lighting systems without pre-defined address. In other words, the present invention has the versatility to be used in lighting systems with both types of lighting bulbs or dots.

7 Claims, 4 Drawing Sheets

Lighting sequence and coordinate data
1(30, 45)
2(100, 45)
3(70, 70)
4(90, 80)
5(160, 130)
6(400, 100)
7(400, 260)
8(85, 280)
9(65, 400)
10(35, 300)

DIGITAL LIGHTING CONTROL SYSTEM WITH VIDEO INPUT

FIELD OF THE INVENTION

This invention relates to a lighting control system, and more particular to a digital lighting control system with video input suitable for both regular and irregular lighting systems.

BACKGROUND OF THE INVENTION

Lighting control systems are important facilities for modern theaters. Lighting control systems are used to create or enhance the atmosphere performance by varying the luminosity of color lights. However, as the earlier lighting control systems are usually manual, it requires the light operator to perform the real-time control as the show proceeds. It is more difficult, and prone to mistakes that may ruin the show. In addition, as the specifications of many lighting systems are different, it increases the difficulty of the lighting control.

DMX-512 was defined in 1986. Since its emergence, DMX-512 becomes one of the most commonly adopted interfaces in the industry. DMX-512 provides the light operators with the convenience that was unprecedented in earlier lighting control systems. In general, a DMX-512 lighting control system, as shown in FIG. 1, comprises a DMX controller 101, a cable 102, and a plurality of light bulbs 111. the cable 102 is used to connect the DMX controller 101 and a plurality of light bulbs 111. The cable 102 can also transmit the control signals issued by the DMX controller 101 to the light bulbs 111. Upon receiving the control signals, the light bulbs 111 will turn on, turn off, or adjust their color or luminosity according to the control signals. In this type of lighting system, each light bulb 111 is given a fixed address (indicated as 1, 2, 3, . . . , N in FIG. 1). The DMX controller 101 uses the fixed address to identify and address a specific light bulb 111. When using the DMX-512 lighting control system, the light operator needs to program the DMX controller 101 in advance. The programming comprises sequencing and setting the color, luminosity, and the timing of each light bulb 111, so that the entire lighting sequence is stored in the memory inside the DMX controller 101. During the show, the DMX controller 101 can repeatedly carry out the pre-programmed lighting sequence.

However, this type of lighting control system suffers from the lack of flexibility because each light bulb 111 must be individually set with a unique address for its identification. Dynamic setting of a lighting sequence during the show is often difficult. Its application is further restricted because DMX-512 system does not provide an interface for video or computer animation inputs.

FIG. 2 shows a second type of lighting control system, a full-color dot-matrix display system. The full-color dot-matrix display systems are widely used because they can be used to display texts, images, animation and video signals. As shown in FIG. 2, a full-color dot-matrix display system usually comprises a video decoder 211, a computer display interface 212, a full-color dot-matrix display controller 220, and a full-color dot-matrix display 221. The video decoder 211 receives the video input 201, and transforms the video input 201 into an input format that is accepted by the full-color dot-matrix display controller 220 to be displayed on the full-color dot-matrix display 221. Similarly, the computer display interface 212 receives the computer VGA signal 202, and transforms the VGA signal 202 into an input format that is accepted by the full-color dot-matrix display controller 220 to be displayed on the full-color dot-matrix display 221. The full-color dot-matrix display 221 comprises a plurality of dots 222 arranged in a regular matrix for easy control. Each dot 222 can display full-color. In other words, a full-color dot-matrix display system can transform the video input or VGA input, and show it on a full-color dot-matrix display. Therefore, a full-color dot-matrix system is suitable for displaying TV or computer images on a large screen in an exhibition or performance. However, as the full-color dot-matrix display controller 220 uses scanning lines for outputting control signals, the system is only applicable to a display system with lighting dots that are arranged in a regular format, such as a matrix.

Due to the disadvantages of the previous two types of lighting control systems, it is important to design a lighting control system that provides functions of both types of lighting control systems so that the aforementioned restriction in usage can be overcome.

SUMMARY OF THE INVENTION

The objective of the present invention is to provide a digital lighting control system with interfaces for transforming video input and VGA input, as well as interface for standard DMX-512 protocol. Therefore, the present invention can be used to control both lighting systems with standard DMX-512 and lighting systems that require neither pre-programmed nor fixed address for light bulbs or dots. In other words, the present invention can be used in controlling standard DMX-512 lighting systems and full-color dot-matrix systems, so that the light systems can be more versatile.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
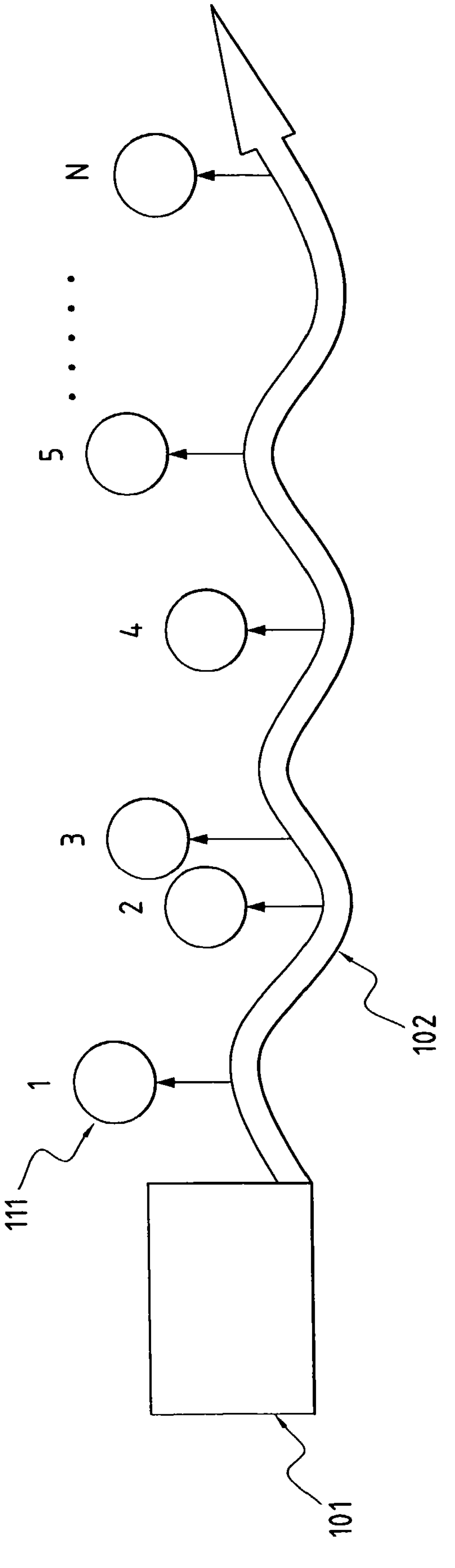
FIG. 1 shows a block diagram of a DMX-512 lighting control system.
Figure 2:
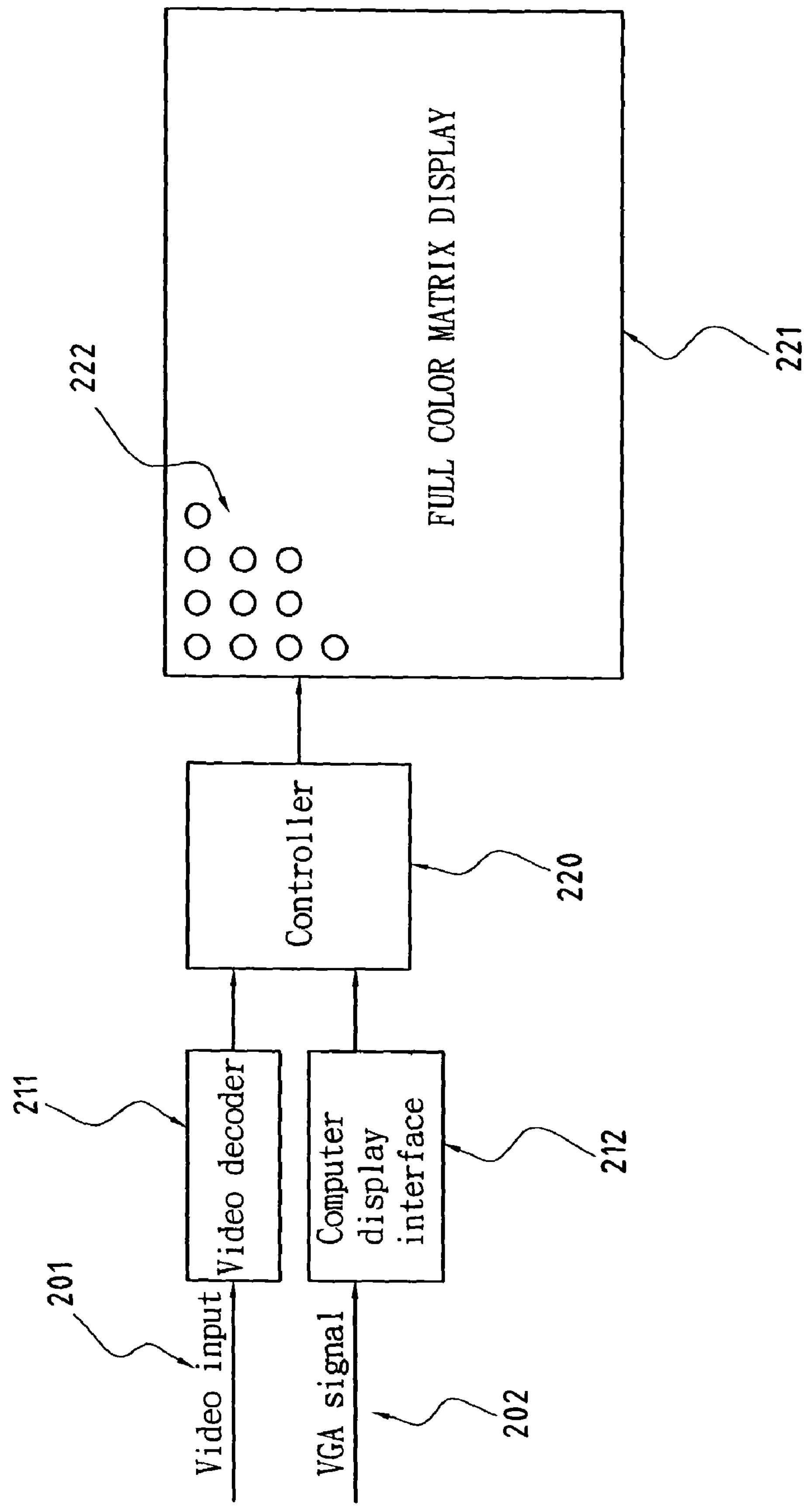
FIG. 2 shows a block diagram of a full-color dot-matrix lighting control system.
Figure 3:
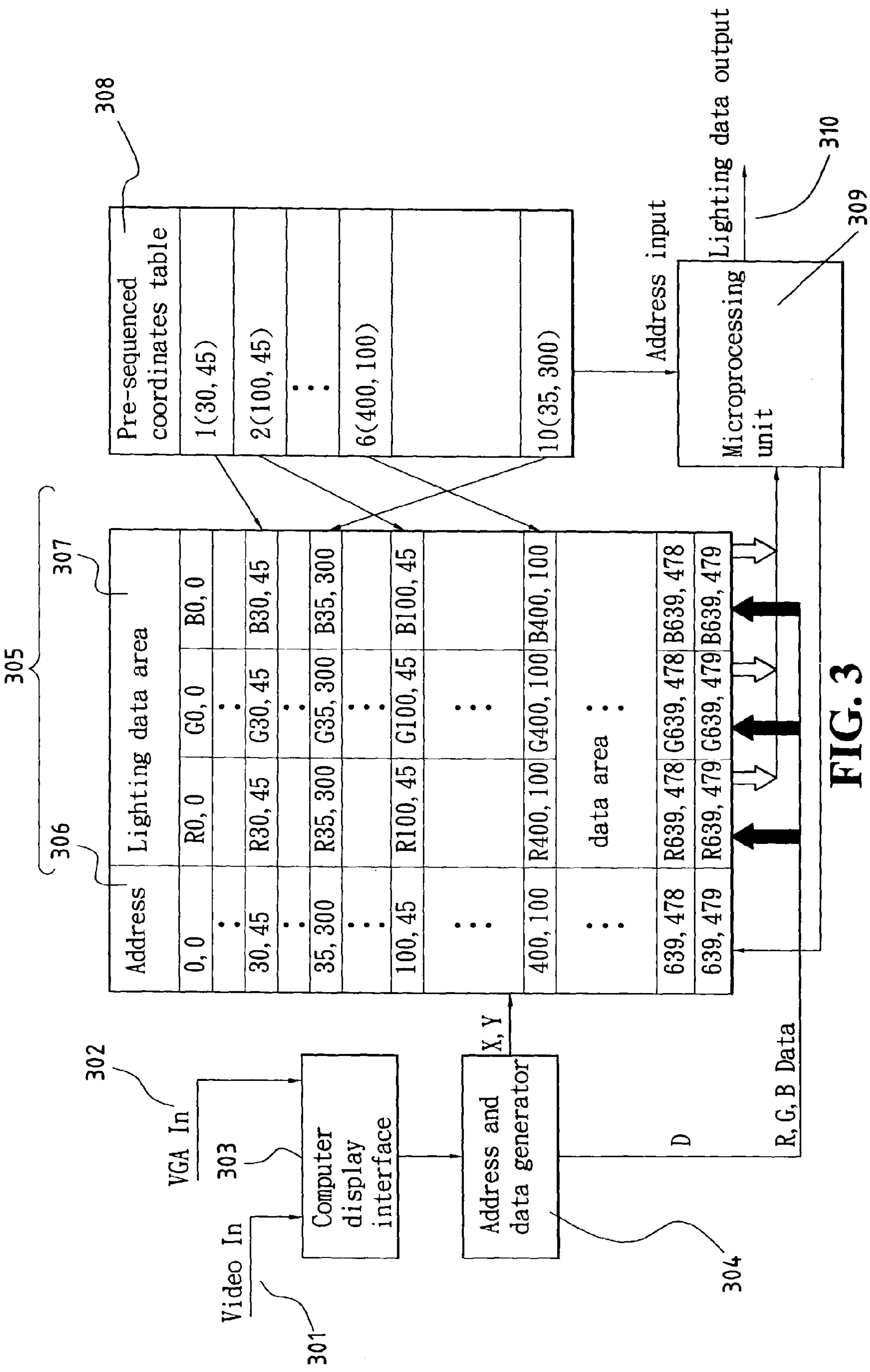
FIG. 3 shows the block diagram of the lighting controller of the present invention.

FIG. 3 shows the block diagram of the lighting controller of the present invention. As shown in FIG. 3, the controller comprises a video decoder and computer display interface 303, an address and data generator 304, a memory 305, a pre-sequenced coordinates table 308, and a microprocessing unit 309. The video decoder and computer display interface 303 can receive both video input 301 and VGA input 302. The received input are then converted into and fed into the address and data generator 304. The video input 301 can be from LD, VCR, live video, or camera equipments. The VGA input 302 can be any computer image data, such as analog VGA, DVI, or LVDS formats. The address and data generator 304 then generates a plurality of data sets. Each data set comprises an address and an (R, G, B) data for a lighting bulb or a dot. The data sets are written into the memory 305, with address and data into address area 306 and lighting data area 307, respectively. The lighting data area 307 can be set to 320×240, 640×480, 800×600, 1024×768 or 1280×1024. The address area 306 has a format of (X,Y) coordinates, which represents the X and Y coordinates of the lighting bulb or dot. The lighting data area 307 has a format of (R, G, B), which represents the red, green and blue components of the lighting bulb or dot.

The pre-sequenced coordinates table 308 stores the coordinates of lighting bulbs or dots in a preset sequence. The microprocessing unit 309 reads the contents of the pre-sequenced coordinates table 308. The coordinates data in the table 308 can be downloaded from the RS-232 serial, parallel port, USB or IEEE1394, or, alternatively, from memory devices such as ROM, EPROM, EEPROM, flash or other memory cards. The coordinates data can also be input from a keyboard (not shown). The microprocessing unit 309 reads the coordinates in the table in a sequential order, and finds the corresponding lighting data of that coordinates in the lighting data area 307 of the memory 305. Finally, the microprocessing unit 309 outputs the lighting data 301. The format of the output 310 can be either standard DMX-512 that requires a fixed address, or a serial data that does not require fixed address.

The present invention further comprises a pixel sharing algorithm for increasing resolution. The pixel sharing algorithm is to compute, with a mathematical formula, the lighting data of a lighting bulb or dot in combination with the lighting data of neighboring bulbs or dots. For example, when the lighting bulb or dot at the coordinates (3,3) is selected, its lighting data can be computed with the following mathematical formula:

$$\text{Red } R \text{ Data}=A(R_{3,3})+B((R_{2,2}+R_{3,2}+R_{4,2}+R_{4,3}+R_{4,4}+R_{3,4}+R_{2,4}+R_{2,3})/8)+C((R_{1,1}+R_{2,1}+R_{3,1}+R_{4,1}+R_{5,1}+R_{5,2}+R_{5,3}+R_{5,4}+R_{5,5}+R_{4,5}+R_{3,5}+R_{2,5}+R_{1,5}+R_{1,4}+R_{1,3}+R_{1,2})/16)$$

$$\text{Green } G \text{ Data}=A(G_{3,3})+B((G_{2,2}+G_{3,2}+G_{4,2}+G_{4,3}+G_{4,4}+G_{3,4}+G_{2,4}+G_{2,3})/8)+C((G_{1,1}+G_{2,1}+G_{3,1}+G_{4,1}+G_{5,1}+G_{5,2}+G_{5,3}+G_{5,4}+G_{5,5}+G_{4,5}+G_{3,5}+G_{2,5}+G_{1,5}+G_{1,4}+G_{1,3}+G_{1,2})/16)$$

$$\text{Blue } B \text{ Data}=A(B_{3,3})+B((B_{2,2}+B_{3,2}+B_{4,2}+B_{4,3}+B_{4,4}+B_{3,4}+B_{2,4}+B_{2,3})/8)+C((B_{1,1}+B_{2,1}+B_{3,1}+B_{4,1}+B_{5,1}+B_{5,2}+B_{5,3}+B_{5,4}+B_{5,5}+B_{4,5}+B_{3,5}+B_{2,5}+B_{1,5}+B_{1,4}+B_{1,3}+B_{1,2})/16)$$

where 1>=A>=0, and A.B.C. That is, the lighting data of the first-circled dots and the second-circled dots of the selected dot are averaged, respectively. Then, the lighting data of the selected dot, and the averaged values are multiplied with appropriate weights, and added to obtain the lighting data of the selected dot. The weight A>B, and C should all be less than 1, and in a decreasing order.

Figure 4:
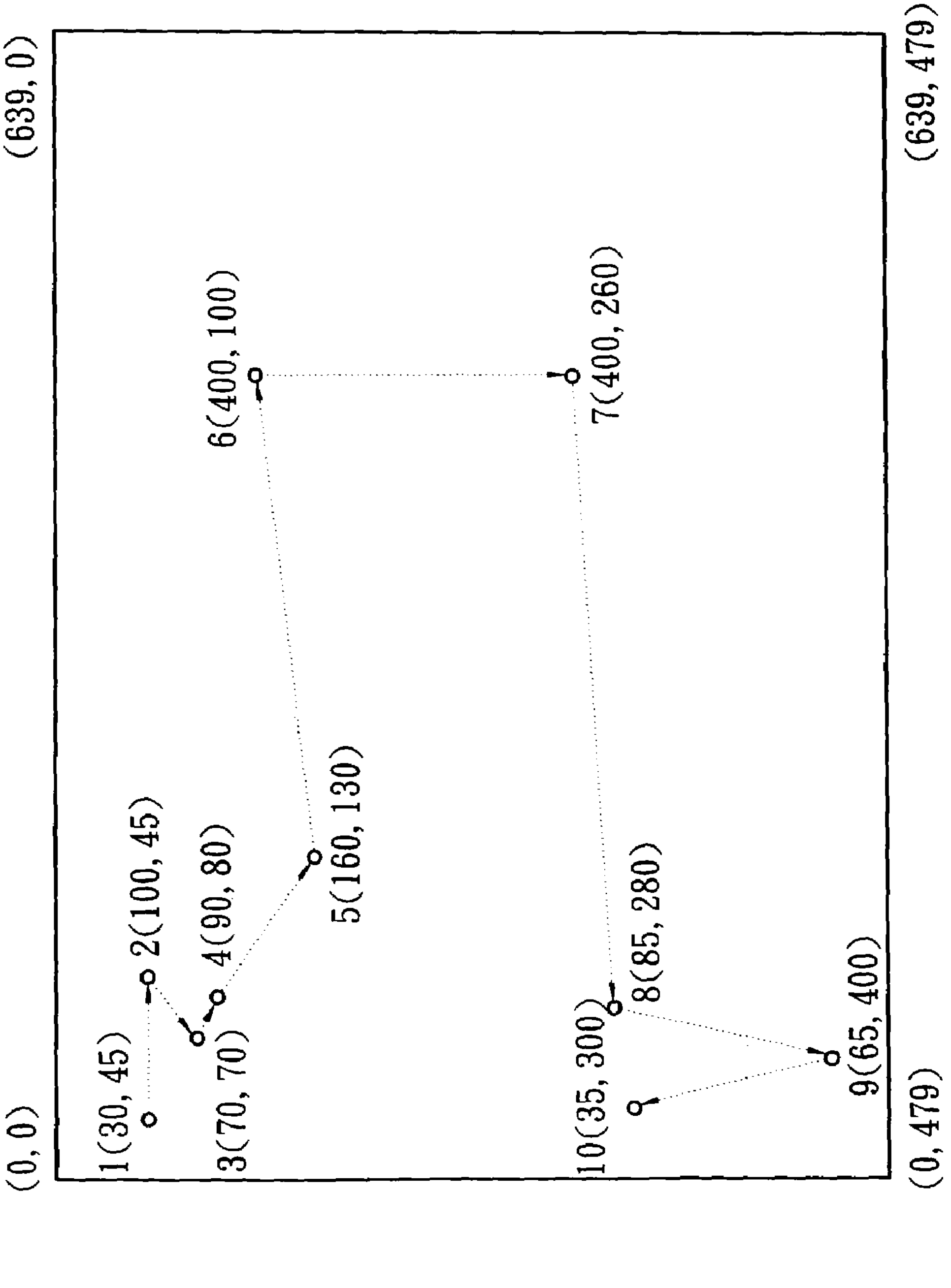
FIG. 4 shows an embodiment of the relationship between the computer screen and the coordinates of the present invention.

FIG. 4 shows an embodiment of the relationship between the computer screen and the lighting bulb coordinates of the present invention. As shown in the FIG. 4, the computer screen 401 can display the lighting bulbs that are specified by the coordinates stored in the table 402, and in the specified order.

Compared to the present invention and the prior arts, the present invention has the advantage of having an interface for video input and VGA input, and can also be used with standard DMX-512 interface. Therefore, the present invention of a lighting system controller can be used both in lighting systems with standard DMX-512 interface, and regularly or irregularly arranged lighting systems without pre-defined address. In other words, the present invention has the versatility to be used in lighting systems with both types of lighting bulbs or dots.

While we have shown and described the embodiment in accordance with the present invention, it should be clear to those skilled in the art that further embodiments may be made without departing from the scope of the present invention.

What is claimed is:

1. A digital lighting system controller with video input capability, comprising:

a video decoder and computer display interface for receiving video input and VGA input and generating formatted data;

an address and data generator for receiving said formatted data and generating a plurality of data sets including coordinate data and lighting data;

a memory having an address area for storing said coordinate data and a lighting data area for storing said lighting data;

a pre-sequenced coordinate table for storing coordinate data of lighting bulbs or dots in a preset sequence; and a microprocessing unit for reading the coordinate data of lighting bulbs in said pre-sequenced coordinate table in a sequential order, finding the lighting data corresponding to the coordinate data of lighting bulbs from said lighting data area, and generating output lighting data;

wherein said controller has a pixel sharing algorithm for increasing resolution of the output lighting data.

2. A digital lighting system controller with video input capability as claimed in claim 1, wherein said video input is from LD, VCR, live video or camera equipments.

3. A digital lighting system controller with video input capability as claimed in claim 1, wherein said VGA input is analog VGA, DVI or LVDS interface data.

4. A digital lighting system controller with video input capability as claimed in claim 1, wherein said coordinate data stored in said address area has a format of (X,Y) coordinates to represent the X and Y coordinates of lighting bulbs, and said lighting data stored in said lighting data area has a format of (R,G,B) to represent red, green and blue components of lighting bulbs.

5. A digital lighting system controller with video input capability as claimed in claim 1, wherein said lighting data area is set to the size of 320×240, 640×480, 800×600, 1024×768 or 1280×1024.

6. A digital lighting system controller with video input capability as claimed in claim 1, wherein said output lighting data is either in the format of DMX-512 standard that requires a fixed address, or serial data that does not require a fixed address.

7. A digital lighting system controller with video input capability as claimed in claim 1, wherein said pixel sharing algorithm is to compute the lighting data of a selected lighting bulb in combination of lighting data of neighboring lighting bulbs of said selected lighting bulb in order to obtain the lighting data of said selected lighting bulb.

* * * * *